United States Patent [19]

Mourier

[11] 4,144,468  
[45] Mar. 13, 1979

[54] AMPLIFYING ROTARY ELECTRICAL MACHINE OPERATING AT RAPIDLY VARIABLE FREQUENCIES AND LEVELS

[75] Inventor: Georges Mourier, Paris, France

[73] Assignee: Thomson-CSF, Paris, France

[21] Appl. No.: 845,404

[22] Filed: Oct. 25, 1977

[30] Foreign Application Priority Data

Oct. 29, 1976 [FR] France .................... 76 32714

[51] Int. Cl.² .......................................... H02K 11/00
[52] U.S. Cl. ....................................... 310/72; 310/112
[58] Field of Search ....................... 310/72, 103, 112

[56] References Cited

U.S. PATENT DOCUMENTS 2,608,623  8/1952  Cutler et al. ................. 310/103 X
2,706,269  4/1955  Kazan ........................... 310/72 X Primary Examiner—Donovan F. Duggan
Attorney, Agent, or Firm—Roland Plottel

[57] ABSTRACT

In a rotary electrical machine, in order to achieve an amplification effect with a high output level, the windings of a series of stators, aligned in front of a series of rotors, assembled upon one and the same axle, are connected to a common (earth) conductor across capacitors. In this fashion a filter made up of $\pi$-cells is obtained, whose amplification factor vis-a-vis a signal injected at the input of the machine, between earth and a terminal, is given by:

$$e^{-\frac{NR}{2}} \cdot \sqrt{\frac{C}{L_s}},$$

this for a machine comprising N rotors and N stators between said input and output, at which the amplified signal is picked off. $L_s$ designates the self-inductance of a stator, C the capacitance of the capacitors, and R the negative resistance which appears in operation within the winding of said stator.

6 Claims, 4 Drawing Figures

AMPLIFYING ROTARY ELECTRICAL MACHINE OPERATING AT RAPIDLY VARIABLE FREQUENCIES AND LEVELS

The present invention relates to a rotary electrical machine.

In the prior art, certain rotary electrical machine designs have been described which combine a certain power level with a relatively high operating frequency which may reach as much as some few kilocycles, whilst at the same time offering a certain number of other properties relating, depending upon the particular variant, to a frequency band, the load-sensitivity, the variation frequency as a function of rotor speed, etc.etc.

These designs are the ones in which the stator is designed as a filter past which there move the poles of a rotor rotating about its axis, and at whose output there can is particular be picked off the amplified wave of a signal injected at the input. In this context, reference may be made to the French Pat. Nos. 2 279 247 et 2 331 187.

These rotary machines operated after the fashion of the travelling wave tubes so well-known from microwave applications, the stators performing the function of the delay line in such tubes which is excited by the rotating part of the machine.

Despite the novel possibilities which they offered, these machines ultimately might present a drawback of mechanical kind: the stator had lost the geometrical and electrical symmetry which it had in earlier kinds of machines since, because of the amplification taking place, the currents increased in amplitude working from the input towards the output of the stator and as a consequence the rotor was subjected not only to the inevitable and essential braking couple but also to a substantial force having a fixed direction within the system of coordinates of the stator. This force gave rise to problems on a very high power machine. Those skilled in the art, will be aware, in other words, of the great care which is normally taken in balancing the rotating parts of large-scale alternators.

Other arrangements made it possible to avoid this nuisance for practical purposes, at low powers and to substantially reduce it in the case of machines operating at medium powers. However, for high-power machines, in which the rotor must be perfectly balanced, these measures may be insufficient.

The present invention relates to a rotary electrical machine in which the stator takes the form of a line made up of a chain of filters, as in the machines which have been discussed earlier, in which the rotor assembly and the stator assembly constitute a symmetrical whole.

To this end, the rotor assembly constituted by several rotors assembled upon a common axle, each rotating in front of part of the line constituting the stator. The stator can itself be split into several separate parts located opposite each rotor, these parts being electrically connected to one another under the conditions which are described in detail hereinafter.

The machine in accordance with the invention operates as an amplifier in relation to an alternating signal injected at the stator input.

The invention will be better understood from a consideration of an ensuing description and the related Figures where:

Figure 1:
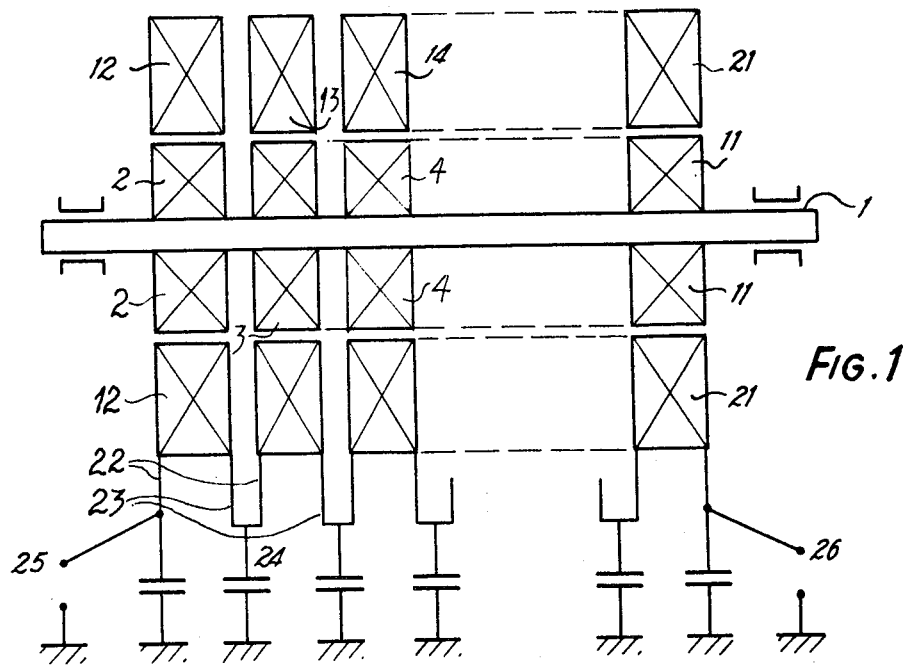
FIG. 1 illustrates a general diagram of machine in accordance with the invention.

FIG. 1 schematically illustrates a section through a machine in accordance with the invention, taken by way of example in order to facilitate explanation. This example is not intended to limit the scope of the invention in any way.

Upon a common axle 1, there are several rotors 2, 3, 4, . . . 11, which are electrically separate, these rotors being located opposite a corresponding number of stators 12, 13, 14, 21. Each rotor and each stator has been illustrated by the intersection between its volume and the plane of the Figure, the intersection being defined by two rectangles symmetrical in relation to the axis or in other words axle 1. Each stator is designed in accordance with current techniques applying to alternators.

The Figure illustrates the electrical connection between the stators of the machine in accordance with the invention, in the case of single-phase operation, this example having been chosen in order to define a practical case.

The windings on the poles of each stator are connected to two conductors 22 and 23. By the provision of these terminals, the stators which behave essentially as self-inductors, are connected with capacitors 24 in order to form a delay line. In the example shown in the Figure, the delay line constitutes a low-pass filter. The first of the conductors 22, working from one end which has been assumed to be the lefhand end, is furthermore electrically connected to a terminal 25 which in company with one of the ends of a common conductor, earthed in the present example, forms the input through which the single-phase current for amplification is injected into the machine. The last of the conductors 23 is connected to one of the output terminals 26 of a single-phase circuit whose other terminal is earthed and which receives the amplying current. The thus-constituted delay line accordingly transmits towards the load, at the righthand side of the Figure, the current excited at the lefthand side by an appropriate generator, this disregarding any action of the rotor upon the filter.

The invention applies equally to a stator constituting a filter other than a low-pass filter; likewise, it relates equally to polyphase currents; in the latter case, the machine comprises an assembly of capacitors such as the aforesaid assembly of capacitors 24, per phase, as well as an input terminal and an output terminal per phase (25, 26 in the former example).

This being the case, the operation of the machine in accordance with the invention as defined by the given example, can be represented in terms of the following consideration.

Under the effect of movement of the rotor, the self-inductance of each rotor 12, 13, . . . 21 is, in a manner known per se, modified within each of the elementary machines constituted by a rotor and its mutually opposite stator, 2 and 12 for example, by the appearance in series with this inductance, of a complex impedance. The impedance Zs of each of these stators, these impedances having been assumed to be identical throughout in order to simplify matters, can be written as: $Z_s = jL_s\omega + R\ (\omega, \Omega) + j\,X\,(\omega, \Omega)$. $L_s$ representing the self-inductance of the stator in question and R and X the two terms of the complex impedance, which depend upon the radian frequency of the alternating signals injected at the input of the machine ($\omega = 2\pi f$) where f is the frequency of the signals) and upon the angular velocity of the rotor.

The resistance R and the reactance X furthermore possess the properties of being substantially less than $L_s\omega$ in terms of absolute value, and of being capable of adopting either of the two signs + or −.

In particular, for each value of the radian frequency $\omega$, there is a range of speeds of rotation of the rotor, extending between two limiting values $\Omega_1$ and $\Omega_2$, for which the resistance R is negative. This range of speeds of rotation is located around and more especially above the synchronous angular velocity $\Omega_s$. The latter is equal, in single-phase working, to the radian frequency of the currents, $\omega$ divided by the number of pairs of poles in rotor and stator.

Figure 2:
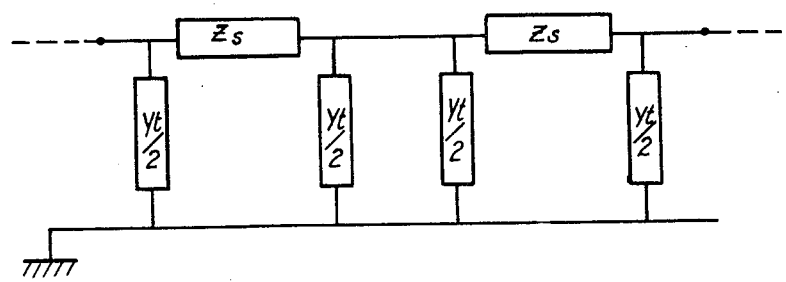
FIGS. 2, 3 and 4, illustrate electrical diagrams relating to three varying embodiments of the machine in accordance with the invention.

The existence of the negative resistance R confers upon the machine in accordance with the invention amplifying properties, as we shall see from the following treatment: The assembly of the stators 12 to 21 can in effect be considered as a chain of active filters comprising $\pi$ - cells connected in cascade, shown in FIG. 2.

The properties of this chain can be summarised by two parameters, namely the characteristic impedance $Z_c$ of the overall line constitited by the stators and the connecting elements (capacitors 24), and the phase-shift $\phi$ each of the cells in the chain, or in other words the unit phase-shift.

As far as the phase-shift $\phi$ is concerned, conventional formulae give us, for a purely capacitive ($Y_t = j\,C\omega$) shunt admittance $Y_t/2$:

$$\sin^2 \phi/2 = -\tfrac{1}{4} Z_s Y_t = \tfrac{1}{4} L_c C\omega^2 - j\,C\omega R + C\omega X;$$

$\phi$ ranging between zero and $\pi$ in the operating band.

This formula illustrates the amplifying properties of each elementary machine, which can readily be defined in the case of low frequencies in the band, that is to say frequencies for which $\phi$ is small, by saying that in this case, substantially, we have:

$$\phi^2 \simeq L_s C\omega^2 + C\omega X - j\,C\omega R$$

and $$\pm\phi \simeq \sqrt{L_s C + \frac{CX}{\omega}} - j\frac{R}{2}\sqrt{\frac{C}{L_s}}$$

for values of R and X which are small compared with the inductance $L_s\omega$ of the stator.

This expression points up, in other words, the existence within the expression for the unit phase-shift $+\phi$, of a positive imaginary part throughout the whole range of speeds of the rotor $\Omega_1$, $\Omega_2$, where R is negative, that is to say a unit amplification factor:

$$e^{-\frac{R}{2}\sqrt{\frac{C}{L_s}}}$$

for a wave defined by the expression: $e^{j(\omega t - \phi)}$. The determination + corresponds to the phase-shift value within each cell of the filter, which is in the direction of propagation of the wave, that is to say, from the left towards the right in the Figure: the determination − corresponds to the value of the phase-shift, which is in the opposite direction.

The foregoing phase-shift is multiplied by the number of elementary machines or filter cells, as well as the amplification which has a factor, considering the overall machine with N rotors and N stators like that shown in FIG. 1, of:

$$e^{-N\frac{R}{2}\sqrt{\frac{C}{L_s}}}$$

Thus, by the addition of storage and phase-shift elements, 24 in FIG. 1, between the different stators 2 to 11 (or stator sections) of the elementary machines, amplification is brought about under the conditions specified earlier. Because of the presence of these elements, the machine in accordance with the invention has a dual symmetry which consists of symmetry about the axis of each elementary machine constituted by one of the rotors and the corresponding stator, and a periodic repetition along the axis. The wave which each elementary machine gives rise, is added to that of the preceding machine and transferred to the next through the agency of the phase-shift produced by the capacitors; phase-addition of the elementary powers in the direction towards the output is brought about by this mechanism. It is because of this that amplification takes place.

This amplification, at a given velocity $\omega$ on the part of the rotors, takes place within the range of frequency f for which R remains negative, that is to say for values of $\omega$ ranging between two limiting value $\omega_1$ and $\omega_2$. These limiting values define the amplification band of the system for a constant value of $\Omega$.

Full calculation shows that this effect can also be exploited throughout virtually all the pass band, generally a much wider band, of the filter constituted by the stators and the capacitors, by varying $\Omega$; this band has a width of around $1/\pi\sqrt{L_s C}$.

Figure 3:
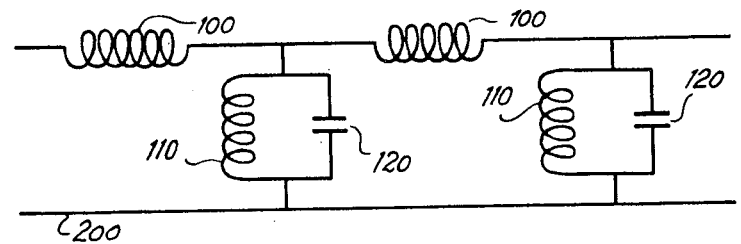

In the foregoing, the example chosen was that of purely capacitive elements 24. Within the context of the invention, these elements could also be resonant circuits comprising an inductance $L_t$ in parallel with the capacitor. These circuits would then be connected between the inductors $L_s$ of the stator, marked 100, and the common conductor 200 as shown in FIG. 3.

The reference 100 designates in this Figure, the inductance $L_t$ and the reference 120 the capacitance of each oscillatory circuit. With this arrangement, the pass band of the machine is reduced in relation to the case described earlier; by contrast, for a given input power, the energy stored in each cell or tank is increased and the gain per cell is also increased as also is the overall amplification of the machine.

Using the machines in accordance with the invention it is possible to control and rapidly shift the amplification band, by controlling the velocity of the rotors.

The machines in accordance with the invention make it possible at radio frequencies, in particular frequencies of some few kilocycles, to achieve powers which very substantially exceed those of a machine of prior art kind, such as one of the elementary machines 2, 12, shown in FIG. 1, as well as those of conventional radio frequency generators. They find application in the design of high-power radio frequency transmitters.

In the foregoing, it was specified that the stators of the machine in accordance with the invention have the known structure of the stators of prior art rotary machines.

No particular hypothesis has been drawn with regard to the design of their rotors, which may correspond with that currently employed in rotary generators. The design of these rotors may also be based upon that more specifically described in the first of the cited applications: here, the rotor comprises one winding per pole and each winding is connected to a high capacitance. In another variant embodiment of the invention, each winding of the rotor is connected to a resistive element, as in the second of the cited applications; finally, in other variant embodiments, the rotor can take any of the forms described in the latter. All these variant embodiments of the machine fall within the scope of the present invention.

In the foregoing, in order to simplify explanation it has been assumed that all the capacitors 24 have the same capacitance. In this case, because of the periodicity of the machine along its axis, the energy stored in each elementary stator increases working from the input towards the output of the machine, and this, in the case where the elementary machines wich make it up are chosen to be identical throughout for reasons of obvious simplicity, means that the first of these elementary machines will have dimensions and a metal mass which are excessive. In order to achieve a better economy in terms of material, a different arrangement can be chosen however. This arrangement likewise falls within the scope of the invention; it has been described hereinafter in the context of a machine whose stator in the low-pass filter like that of the preceding example, made up of elementary stators which are identical throughout and have the same individual impedance $Z_s$. This novel variant embodiment, unlike the variant described earlier, comprises connecting capacitors with a capacitance $C_n$ varying from one cell of the filter to the next, n designating the order of the cell working from the input of the machine. In this variant embodiment, it has been assumed that the cells are matched in terms of impedance and that the currents in the elementary stators, that is to say in the cell-inductances $L_s$, all have the same absolute value $|I|$. All the elementary stators then, with the exception of phase, operate identically, each contributing a unit of power $P_u$ to the operation of the machine.

Figure 4:
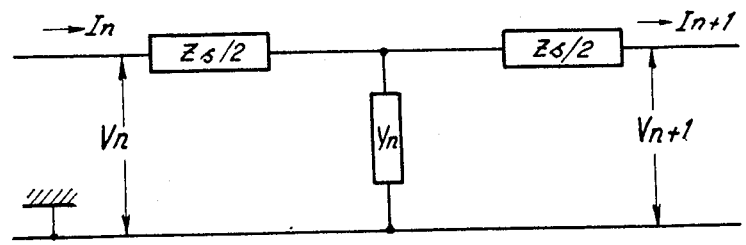

The value of the capacitance $C_n$ will be determined, in an example, assuming the filter constituted by the stator to be formed by T-tanks or cells, as illustrated in FIG. 4. In this Figure, $V_n$ and $V_{n+1}$ designate the voltages across the terminals of the cells of order n and n+1 respectively, whilst $I_n$ and $I_{n+1}$ designate the currents in the impedances $Z_s$ in the cells.

The power across the terminals of the cell of order n, is given by $P_n = \frac{1}{2}|V_n| \times |I|$ and that across the terminals of the cell of order n+1 by: $P_{n+1} = \frac{1}{2}|V_{n+1}| \times |I|$, and this, bearing in mind that $P_{n+1} = P_n + P_u$ in accordance with what has been said earlier, means that:

$$|V_{n+1}| - |V_n| = \frac{2P_n}{|I|} \text{ and } Z_{n+1} - Z_n = \frac{2P_u}{I^2} \quad (1)$$

$Z_n$ designating the characteristic impedance of the cell of order n. The formula (1) shows that the characteristic impedances of the successive cells are related to one another by an arithmetic progression.

However, characteristic impedance of a celle, considering a T-filter as shown in the Figure, is defined by:

$$Z_n^2 = \frac{Z_s}{Y_n} 1 + \frac{ZY_n}{4} = \frac{L_s}{C_n} 1 - \frac{L_s C_n \omega^2}{4},$$

which, neglecting the second order term, can be written as:

$$Z_n \cong \sqrt{L_s/C_n}.$$

Finally, assuming that the power injected at the input of the machine is equal to the unit power $P_u$, then, considering equation (1), we can put:

$$Z_n = 2n\, P_u/I^2$$

and, consequently:

$$C_n = \frac{L_s}{Z_n^2} = \frac{1}{2} L_s I^2 \times \frac{I^2}{2n^2 P_u^2}.$$

This latter expression defines the law of variation of the capacitances of the linking capacitors in a special embodiment of the variant form of the machine whose stator is constituted by a filter in which the cells are not identical to one another. It illustrates the facility which is available to choose the capacitances $C_n$ in such a fashion that the power stored is the same in all the elementary stators. The volume of these capacitances is in this case constant working from one end to the other of the machine.

By way of example, it will be observed that with the machine in accordance with the invention powers of the order of around 10 megawatts can be achieved continuously at a frequency of 5 kHz, within an amplification band $(\omega_1, \omega_2)$ of 20% around this frequency.

Of course, the invention is not limited to the embodiments described and shown, which were given solely by way of example.

What is claimed, is:

1. A rotary electrical machine comprising a series of rotors assembled upon one and the same axle and rotating about the axis thereof in operation, and a stator assembly, characterised in that said stator assembly is made up of elementary stators each arranged opposite one of said rotors and electrically equivalent in each case to self-inductances, said elementary stator being associated with storage elements in order to form cascade-connected cells each constituting a stator, successively passing the wave associated with alternating signals applied to the input of the first of said cells.

2. A rotary electrical machine as claimed in claim 1, characterised in that said self-inductances are each connected in series with one of the self-inductances of each of the other elementary stators; in that said self-inductances are connected to storage elements through which they are likwise connected to common conductors, said common conductors each forming in association with said series-connected self-inductances, a line having two input terminals and two output terminals; and in that between said input terminals there is connected a generator producing alternating signals, and between said output terminals a load in which there is picked off the wave corresponding to said signals propagated by said lines.

3. A rotary electrical machine as claimed in claim 1, characterised in that said storage elements are capacitors.

4. A rotary electrical machine as claimed in claim 1, characterised in that said storage elements are oscillatory circuits.

5. A rotary electrical machine as claimed in claim 3, characterised in that said capacitors are identical throughout.

6. A rotary electrical machine as claimed in claim 3, characterised in that the capacitances of said capacitors decrease working from the input towards the output of the machine.

* * * * *